March 4, 1930.  D. M. BELCHER  1,749,310
VALVE OPERATING DEVICE
Filed July 25, 1924
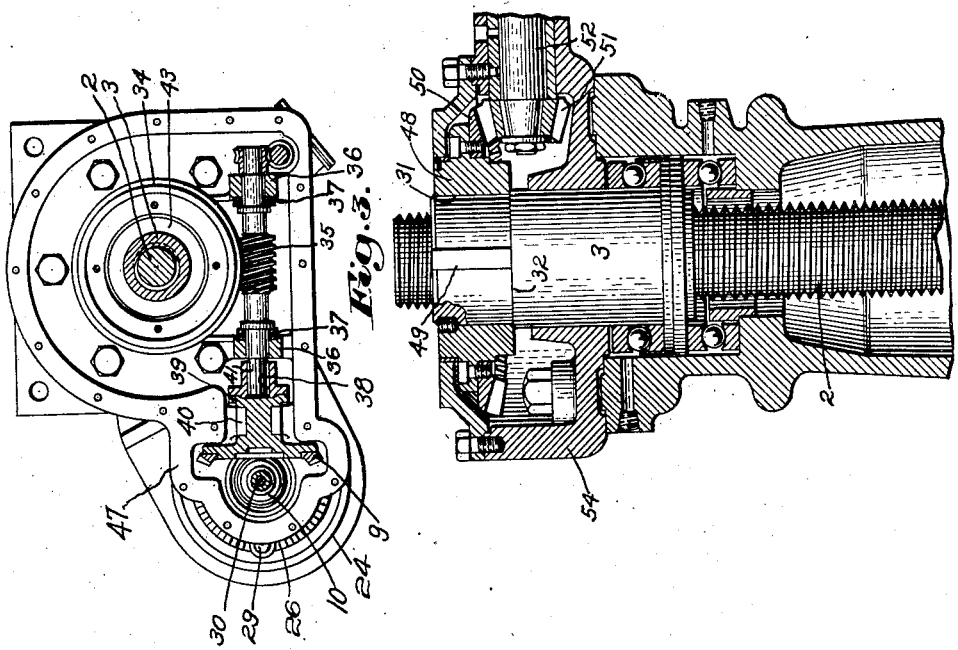
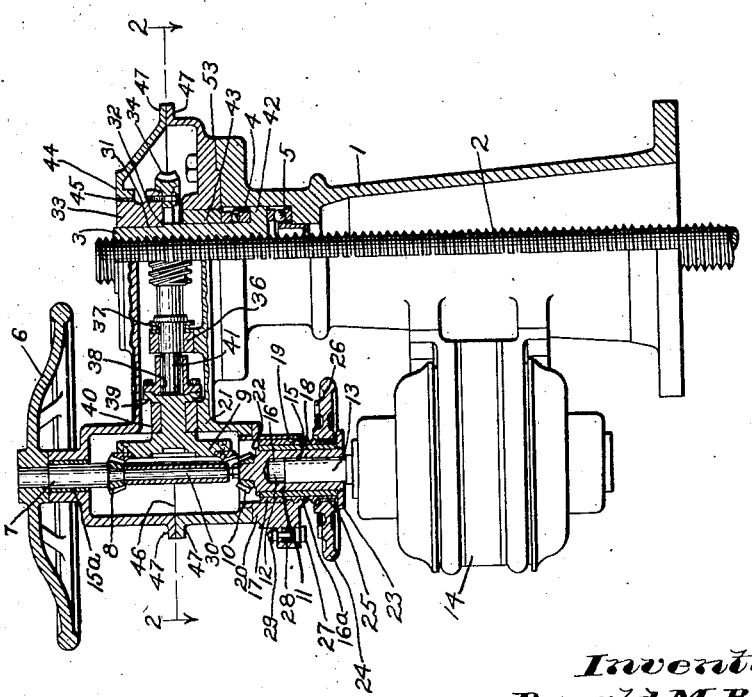
Inventor:
Donald M. Belcher,
by Emery, Booth, Janney & Varney.
Attys.

Patented Mar. 4, 1930

1,749,310

UNITED STATES PATENT OFFICE

DONALD M. BELCHER, OF WINCHESTER, MASSACHUSETTS, ASSIGNOR TO COFFIN VALVE COMPANY, OF NEPONSET, MASSACHUSETTS, A CORPORATION OF MAINE

VALVE-OPERATING DEVICE

Application filed July 25, 1924. Serial No. 728,145.

This invention relates to valve operating devices and has for its object to provide simple, efficient and powerful means for operating large or small gate, sluice way or other valves either by manual or power operating means.

In the accompanying drawings wherein I have shown merely for illustrative purposes one embodiment of my invention;

Fig. 1 is a vertical section, partly in elevation, of a gate valve stand showing the valve stem and instrumentalities for operating the same;

Fig. 2 is a section taken on the line 2—2 of Fig. 1; and

Fig. 3 is a detail vertical section of the upper end of a gate stand showing a modified form of valve stem operating means.

In the preferred exemplification of my invention I have shown a hollow pedestal or stand 1 arranged to enclose a portion of a valve stem 2 of well known form herein screw threaded for a portion of its length and engaged by a nut 3 having corresponding screw threads and rotatably mounted in appropriate bearings such, for example, as ball bearings 4 and 5 arranged within said stand.

The valve shaft or stem 2 is preferably arranged for axial movement only, any rotary movement thereof being prevented because of its connection with the gate of the valve which it operates, but as this feature of the invention is well known to those familiar with the art the valve and its connection with said stem have been omitted, the stem being shown broken off just below the base of the stand 1.

Axial movement of the valve stem may obviously be effected in many ways but I prefer to provide both manual and power operating means, each capable of being operably connected up with one valve stem actuating means to the exclusion of the other operating means.

The manual operating means herein shown includes a handwheel 6 secured to a vertically arranged shaft 7 that is journalled to rotate in a part of the stand 1.

A driving gear preferably in the form of a bevel pinion 8 is secured to the shaft 7 and is adapted to be moved into and out of operating engagement with a driven gear, herein a bevel gear 9, the latter being operatively connected through suitable gearing, hereinafter described, with the said nut 3 to rotate the same and thereby produce the axial movements of said valve stem.

The power operating means for the valve stem 2 may obviously embody various forms but the example shown includes a bevel pinion 10 adapted to be moved into and out of operating engagement with the gear 9, said pinion being secured to a tubular driving member 11 axially bored at 12 to receive the end of a power shaft 13 such, for example, as the armature shaft of an electric motor 14.

To allow for a limited axial movement of the member 11 desirable to effect movement of the pinion 10 into and out of engagement with the gear 9, the shaft 13 is provided with a key 15 which slidably engages in a groove 16 formed lengthwise of the bore of said member 11.

I desirably arrange the gears 8 and 10 with their axes substantially coincident, with the shaft 7 of the gear 8 journalled in an eccentric bushing 15$^a$ so that the teeth of the gears 8 and 9 may be properly adjusted to compensate for wear.

Upon the opposite side of the axis of the gear 9 from the pinion 8, the member 11 of the pinion 10 is journalled in a bushing 16$^a$ supported in an adjustable sleeve 17, preferably having screw threads 18 upon its outer face arranged to engage corresponding internal threads 19 upon a fixed part 20 attached to a hollow extension 21 of the stand, said sleeve 17 serving as a carrier for the bushing 16$^a$ with which it is mounted for conjoint rotary and axial movement, whereas, the driving member 11 although compelled to move axially with said sleeve 17 by a flange 22 at its upper end and a detachable collar 23 at its lower end, each engaging its respective end of the bushing 16$^a$, is permitted to be rotated independently of said sleeve by the motor 14 to impart movement to the gear 9 when in engagement therewith.

Rotary motion is imparted to the adjustable sleeve 17 relatively to its support herein by a handwheel 24 which is appropriately secured thereto as by key 25, whereupon a combined rotary and axial movement of said sleeve may be effected to move the teeth of the gear 10 into and out of mesh with those of the gear 9.

It is desirable at times to lock the gear 10 in its adjusted position preferably when it is in engagement with the gear 9, hence the handwheel 24 is provided with ratchet teeth 26 to engage with a pawl 27 yieldingly mounted in the fixed part 20 of the frame when said ratchet is moved to its proper position by the screw means including the threads 18 and 19. A spring 28 yieldingly urges the pawl 27 into contact with the teeth 26 and a finger piece 29 is attached to said pawl with which to raise it when it is necessary to release the ratchet.

Desirable the screw means hereinbefore described is arranged to move the gears 8 and 10 in unison so that when one moves into mesh with the gear 9 the other will be disengaged therefrom and vice versa, thereby preventing stripping of the teeth from said gears. To accomplish this result a rod 30, attached to one or the other of said gears but not to both, fills the space between them so that as the member 11 moves up to cause its pinion 10 to engage the gear 9, said rod will push the gear 8 out of engagement with said gear 9, and conversely as said gear 10 is lowered the gear 8 will be forced down by its weight and that of the shaft 7 and handwheel 6 to again engage the teeth of the gear 9.

The motor 14 may be supported in operating relation to the member 11 in any appropriate manner but preferably it is secured to the stand 1 as herein shown.

As previously stated, motion is imparted from the gear 9 to the nut 3 by appropriate gearing adapted to rotate said nut at the proper speed ratio, and this gearing may likewise embody different forms, for example, in Figs. 1 and 2 said nut is shown reduced at 31 to form a shoulder 32 and against this shoulder is secured and keyed a hub 33. To the hub 33 in turn is secured a worm gear 34 engaging a worm 35, the latter journalled in suitable bearings 36 carried by the stand 1. End thrust ball bearings 37 may also be provided as shown, to take the thrusts of said worm.

It is within the scope and purpose of the invention to extend the worm shaft directly to the gear 9 but as it is desirable often to change the ratio of the gearing and to replace the worm and other parts because of wear, I prefer to provide coupling means between said gear 9 and worm 35 consisting of a female coupling section 38 detachably secured to the hub 39 of the gear 9 which is for convenience journalled in a bearing 40 in said stand.

The shaft of said worm 35 is appropriately shaped at 41 to fit said coupling section 38, thereby causing said gear and worm to rotate in unison.

Axial movement of the nut 3 is prevented by an annular flange 42, one face of which engages the bearing 4 and the other the bearing 5. In addition to said bearings 4 and 5 the nut 3, which is preferably cylindrical at least for a portion of its length, is journalled to rotate in a bushing 43 mounted in said stand and this bearing is assisted in properly supporting the nut by a bearing 44 formed also in a portion of said stand and engaged by a bearing or friction ring 45 herein detachably secured to the hub of said gear 33 so as to be readily replaceable when it becomes worn.

It is desirable in devices of the nature shown herein to enclose the working parts such as the gearing and to run them in oil or other suitable lubricant but to facilitate assembling and access to make repairs said standard is preferably made in sections one separation substantially following the axis of the worm 35 as shown at 46 or section line 2—2 Fig. 1, and having the abutting edges of the casing provided with bolt flanges 47.

It is not always desirable to gear down from the motor 14 to the nut 3 by means of worm gearing as shown in Figs. 1 and 2 and this invention is not, therefore, limited to such a construction but for this purpose other forms of gearing such, for example, as a bevel gear drive illustrated in the modified form of Fig. 3 may be employed. Here the stem 2 and nut 3 may be made as before, a hub 48 being secured to the reduced and shouldered part of said nut and keyed as shown at 49.

To the hub 48 is secured a bevel gear ring 50 which meshes with a bevel pinion 51 driven by the gear 9 through a shaft 52 which may obviously take the place of the worm 36 and its shaft shown in the preceding figures.

Where a worm drive is employed the worm shaft is arranged substantially tangential to its worm but where a bevel gear drive is used the pinion shaft 52, for example, would have its axis arranged in a radial line from the center of the valve stem 2 to the axis of the shaft bearing the gear 10, see Fig. 2.

To facilitate making such changes in the style, type and ratio of gearing used in transmitting motion to said valve stem the stand 1 is further divided as shown at 53, Fig. 1, permitting the entire upper section or at least that portion which contains the train of reducing gears, to be removed and replaced by a section similar, for example, to the part 54 shown in Fig. 3, containing the bevel gear train.

Although I have shown in the accompanying drawings and described in the foregoing specification, specific embodiments of my invention it is to be understood that the invention is not limited thereto but may be materially varied, the scope of the invention being set forth in the following claims.

Claims:

1. In an apparatus of the class described, in combination, a valve stem, means to impart movement to said stem including a driven gear, a manually operable pinion adapted to operatively engage said gear, a power driven pinion coaxially arranged to move axially in a plane substantially at right angles to the axis of said driven gear and adapted to operatively engage said driven gear and means to move one of said pinions into and the other out of engagement with said gear.

2. In an apparatus of the class described, in combination, a valve stem, means to impart movement to said stem including a driven gear, a power shaft, a driving gear axially movable relative to said power shaft into and out of operative engagement with said driven gear, means for effecting the axial movement of said driving gear, and normally inactive ratchet means adapted automatically to become operative upon movement of said driving gear into engagement with said driven gear, positively to prevent disengagement of the power driving gears.

3. In an apparatus of the class described, in combination, an axially movable valve stem, means to impart axial movement to said stem including a driven gear, a power shaft, a driving gear axially movable upon said power shaft into and out of operative engagement with said driven gear, screw means for effecting the axial movements of said driving gear, and normally inactive ratchet means adapted automatically to become operative upon movement of said driving gear into engagement with said driven gear, positively to prevent disengagement of said gears.

4. In an apparatus of the class described, in combination, an axially movable valve stem, means to impart movement to said stem including a driven gear, a motor shaft, a driving gear axially movable upon said motor shaft into and out of operative engagement with said driven gear, screw means for effecting the axial movements of said driving gear, normally inactive ratchet means adapted automatically to become operative upon movement of said driving gear into engagement with said driven gear, to prevent disengagement of said gears, and means for releasing said ratchet means.

5. In a valve operating mechanism, in combination, a valve stem, means to impart axial movement to said stem, including a driven shaft, bevel gear means operatively connected with said shaft, a pair of bevel pinions, manual means for operating one of said pinions, power means for operating the other of said pinions, and manually operated screw means positively to lock said power-operated pinion in positive operative relation with said bevel gear means.

6. In an apparatus of the class described, in combination, a valve stem, means to impart movement to said stem including a driven gear, a motor shaft, a driving gear axially movable upon said motor shaft into and out of operative engagement with said driven gear, means for effecting the axial movement of said driving gear, normally inactive ratchet means adapted automatically to become operative upon movement of said driving gear into engagement with said driven gear to prevent disengagement of said gears and means for releasing said ratchet means.

7. In an apparatus of the class described, in combination, a valve stem, means to impart movement to said stem to open and close the valve, including a driven gear, a motor shaft, a driving gear movable into and out of operative engagement with said driven gear, means for effecting relative movement between said driving gear and said driven gear into and out of operative engagement, normally inactive ratchet means adapted automatically to become operative upon movement of said gears into operative engagement to prevent disengagement of said gears and means for releasing said ratchet means.

In testimony whereof, I have signed my name to this specification.

DONALD M. BELCHER.